J. BARTUZEL.
SLED ATTACHMENT FOR VEHICLES.
APPLICATION FILED JULY 21, 1920.
1,380,860.
Patented June 7, 1921.
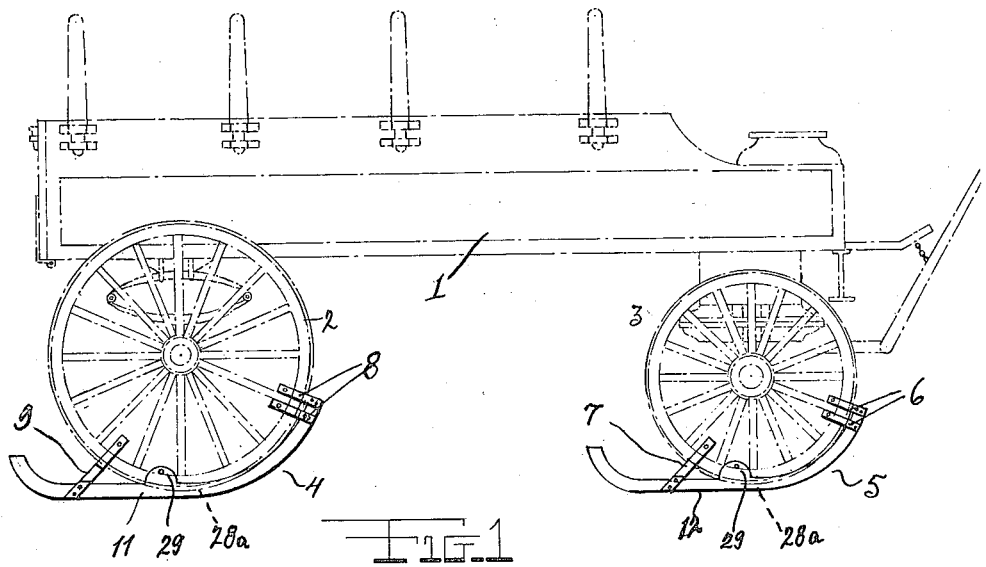
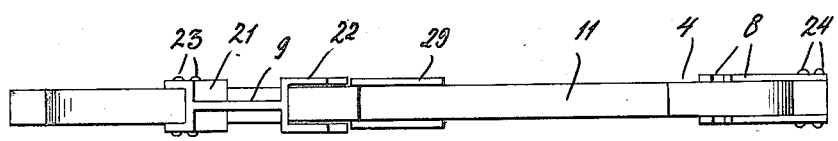
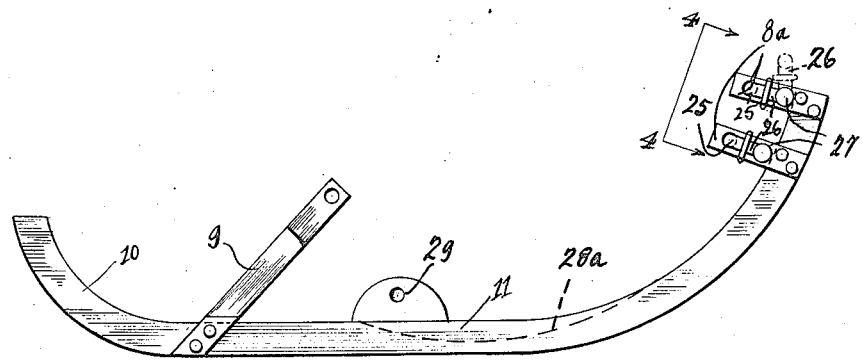
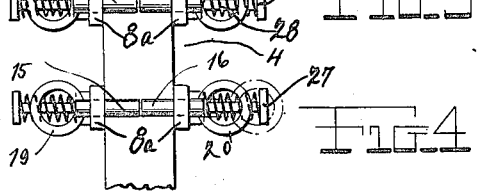
INVENTOR.
J. Bartuzel
BY
ATTORNEY.

UNITED STATES PATENT OFFICE.

JAN BARTUZEL, OF YOUNGSTOWN, OHIO.

SLED ATTACHMENT FOR VEHICLES.

1,380,860.          Specification of Letters Patent.     Patented June 7, 1921.

Application filed July 21, 1920. Serial No. 397,817.

*To all whom it may concern:*

Be it known that I, JAN BARTUZEL, citizen of Poland, and resident of Youngstown, in the county of Mahoning and State of Ohio, have invented certain new and useful Improvements in Sled Attachments for Vehicles, of which the following is a specification.

This invention relates to sled attachments for vehicles, and has for its main object the provision of such a device by means of which a vehicle may be readily converted into a sled for use on snowed-over or icy roads.

The above and other objects will become apparent in the description below, in which characters of reference refer to like-named parts in the drawings.

Referring briefly to the drawings, Figure 1 is a side elevational view of my attachments in position upon the wheels of a wagon, shown dotted.

Fig. 2 is a plan view of one of the attachments.

Fig. 3 is a side elevational view of the same.

Fig. 4 is an enlarged view of the securing means for said attachments, taken on the plane 4—4 of Fig. 3.

Referring now in detail to the drawings, the numeral 1 represents a wagon having wheels 2 and 3, the rear wheels thereof being equipped with my runner attachments indicated at 4, and the front wheels thereof equipped with the same indicated at 5. Braces 6 and 7 secure the front attachment 5 to the front wheels, and similar braces 8 and 9 secure the rear attachments 4 to the rear wheels. The wheels are retained upon the runner 11 by means of the fork 22 extending from the upper end of the brace 9, at the rear, and upon the base 11 and the forward part of the runner body, being retained at the forward end by partially circumferential bands, or, as aforementioned, braces, 8. The braces 9 are secured to the runner 4 by means of a fork-shaped lower end 21 secured by means of rivets or the like 23. In addition, the forward part of each member is hollowed out as at 28 to provide a rest for the wheel. Upright ears 29 further secure the runners.

In order that the device may be quickly attached or removed, I have provided a modified form of securing the runners as shown in Figs. 3 and 4. The braces 8ª, equivalent to those indicated at 6 and 8, are attached to the runner 4, as before, but are provided with oppositely disposed holes 25. Members 26 are pivotally mounted at 27 in said braces. Coiled springs 28 surround the pivots 27, and urge the latter in a counter-clockwise direction, so as to force the pins 13, etc., hereafter described, against the wheel felly. Said pins 13, 14, 15, and 16, extend from the upper ends (Fig. 3) of the members 26, and attached to said pins are rings 17, 18, 19, and 20, adapted to be gripped by the fingers.

Now, assuming that the runner 4 is in place on the wheel 2, and it is desired to remove the runner, then the rings 17, 18, 19, and 20, are grasped and drawn outward, whence the pins 13, 14, 15, and 16, are withdrawn from contact with the wheel felly. The members 26 are then turned slightly upon their axes or pivots 27, and the runner is withdrawn from the wheel. A similar means may be provided on the other braces 9 of the runner. Since both runners, forward and rear, are alike in every substantial respect, both have not been separately described; the base 12, as is apparent, is similar to the base 11.

Thus I have provided a device by means of which any vehicle may readily be converted into a sled, for use when the condition of the streets is such that only sleds are able to move about.

I claim:

A wheel runner attachment comprising a single unitary element bent upwardly at its front end and to a lesser extent at the rear, said element having a central channel receptive of a portion of the rim of a single wheel, a brace riveted to said element at the rear thereof, forks formed with said brace engaging the wheel rim, two distinct pairs of forks riveted to the front bent end of said runner element also engageable with the wheel rim and manually operable spring impelled devices carried by each of said forks for detachably engaging the runner to the rim, said devices being arranged in opposed paired relation.

Signed at Youngstown in the county of Mahoning and State of Ohio this 15th day of June A. D. 1920.

JAN BARTUZEL.